UNITED STATES PATENT OFFICE.

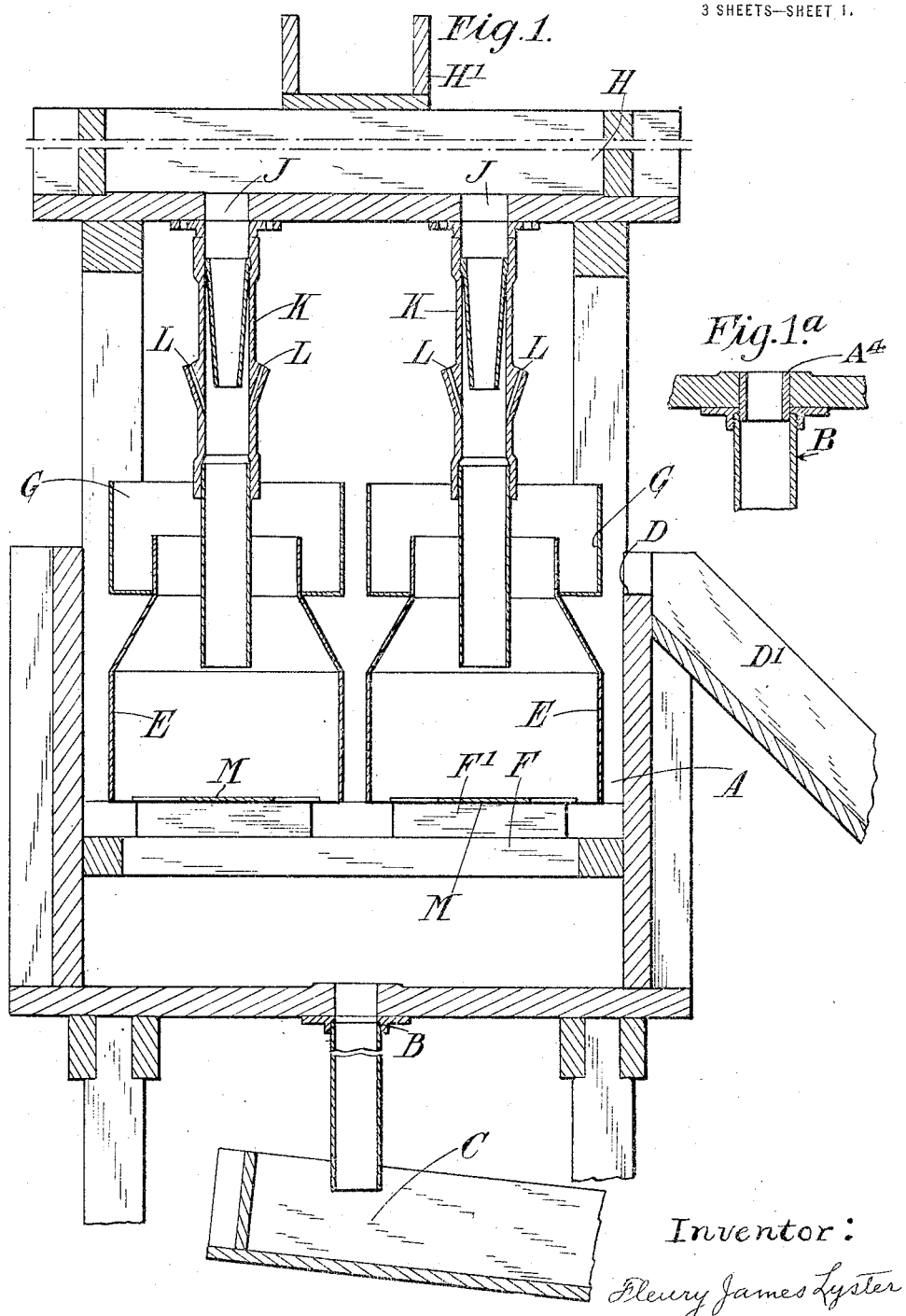

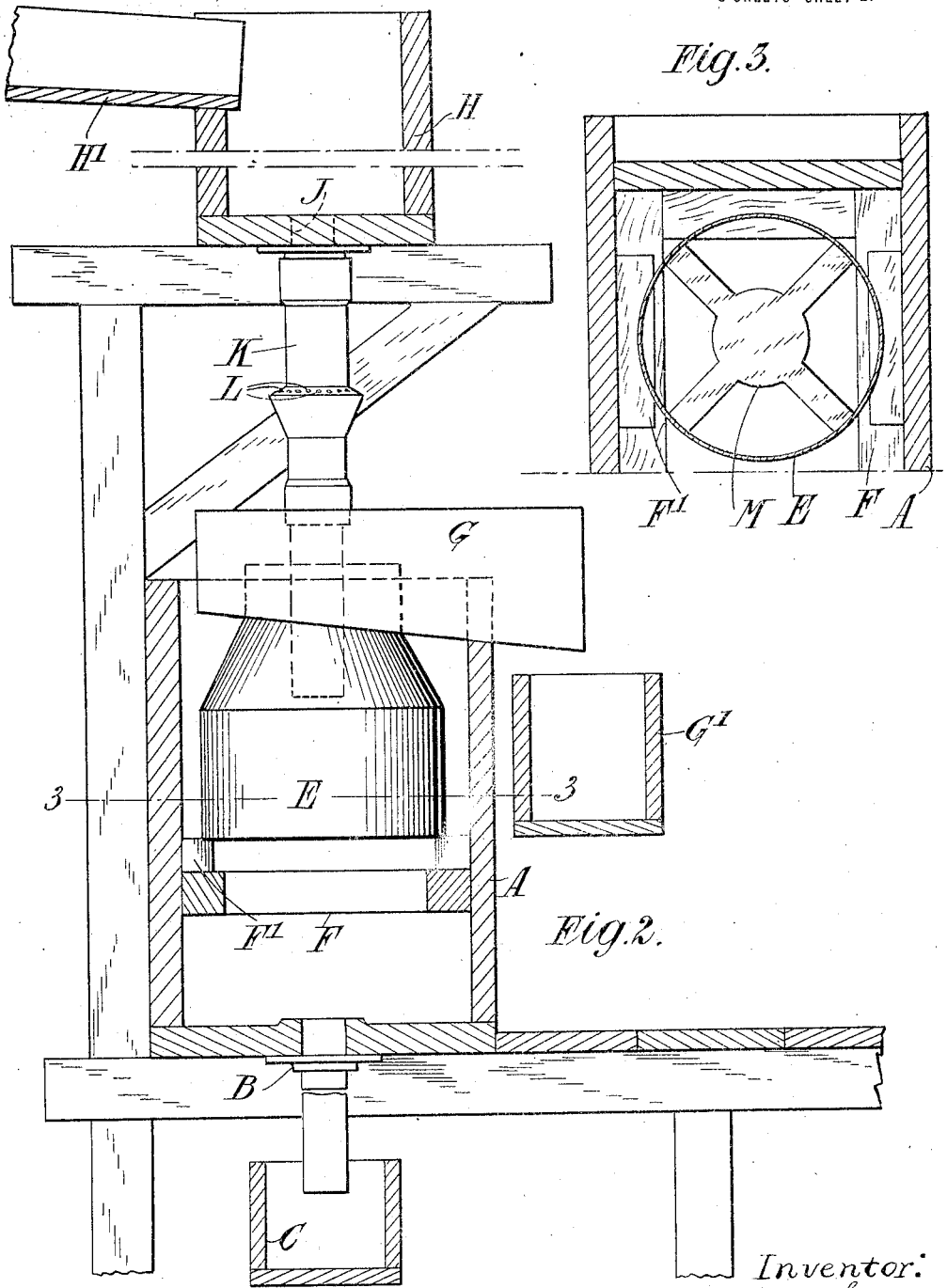

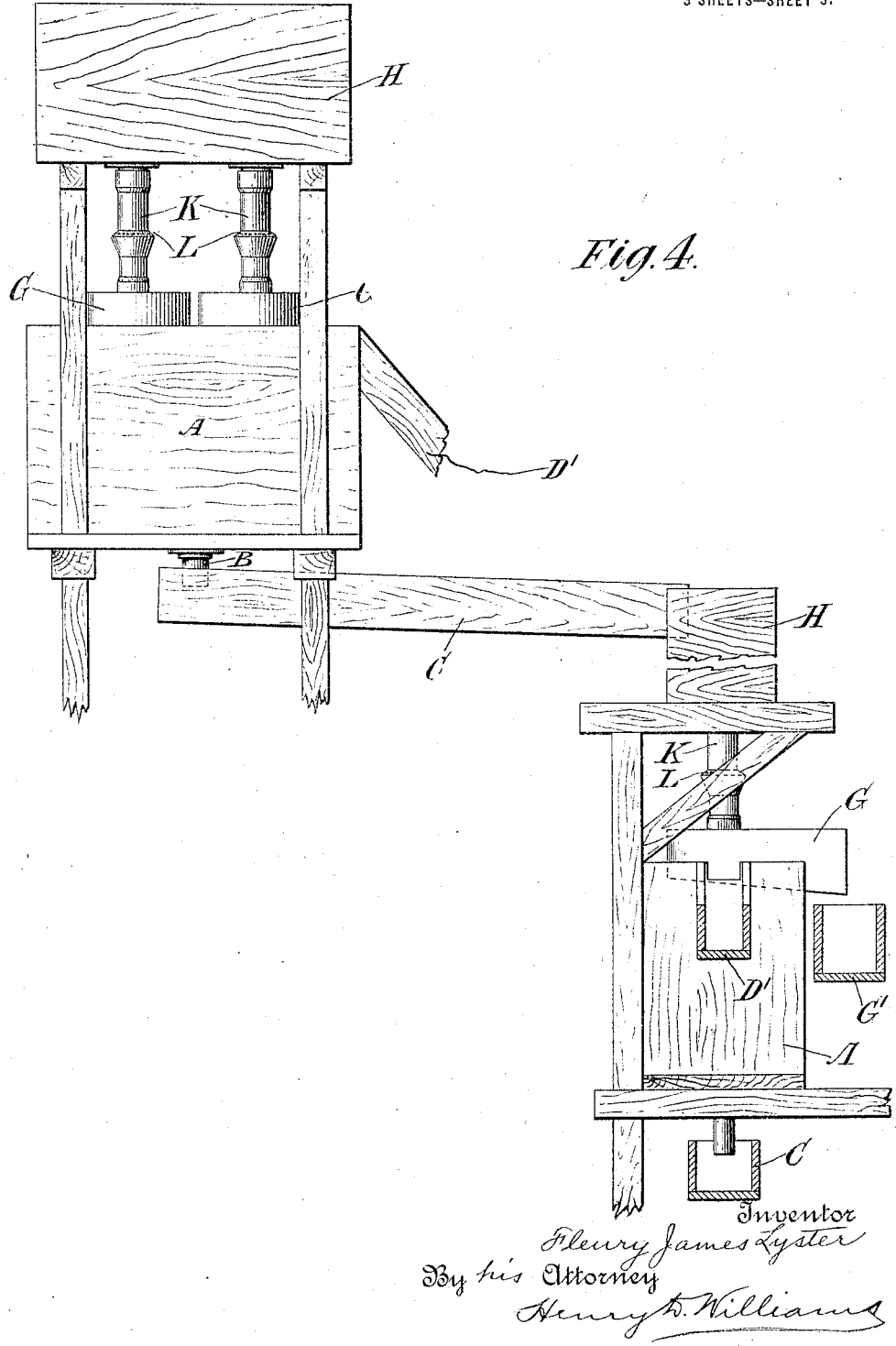

FLEURY JAMES LYSTER, OF BROKEN HILL, NEW SOUTH WALES, AUSTRALIA, ASSIGNOR, BY MESNE ASSIGNMENTS, TO MINERALS SEPARATION NORTH AMERICAN CORPORATION.

APPARATUS FOR THE CONCENTRATION OF ORES.

1,380,665.     Specification of Letters Patent.    Patented June 7, 1921.

Application filed November 18, 1916. Serial No. 132,058.

*To all whom it may concern:*

Be it known that I, FLEURY JAMES LYSTER, a subject of the King of England, residing at Broken Hill, New South Wales, Australia, have invented certain new and useful Improvements in Apparatus for the Concentration of Ores, of which the following is a specification.

This invention is for improvements in or relating to the concentration of ores and it refers more particularly to apparatus for the concentration of ores by froth-flotation in which the ores are subjected to aeration in an aqueous separating medium in the presence of a frothing agent for the formation of a froth of the metalliferous particles, as is described for example in the prior Patents Nos. 835,120 of November 6, 1906, 962,678 of June 28, 1910, and 1,064,723 of June 17, 1913.

This invention is applicable to the treatment of ores, concentrates, tailings, slimes or other metallurgical products, and it will be understood that in the specification the term "ores" will include all such metallurgical products as well as crude materials.

The present invention is an improvement in or modification of the apparatus described in Patent No. 1,311,919 of August 5, 1919, to Seale and Shellshear. In the said prior patent is described an apparatus for carrying out the froth flotation process comprising the combination, with a separating box or vessel having a residues outflow at the bottom, of a feed box open at the top and having an inflow pipe at the side thereof and a discharge pipe at the bottom delivering into the separating box or vessel below the surface of the liquid, with such a flow of material within the said pipe or tube as to insure the entrapping of the air necessary for the aeration of the pulp by the flow of the material itself. A number of such separating boxes and feed boxes may be arranged in series one above the other, the residues outflow from each separating box delivering into a feed box, and each feed box having a discharge pipe at the bottom delivering to the next succeeding separating box or vessel.

In a modification of the apparatus described in the said prior patent and specifically patented in Patent No. 1,311,920 of August 5, 1919, a number of separating boxes are arranged one above the other, the discharge pipe from each separating box delivering to the next succeeding separating box below the level of the liquid therein, and being provided with a series of inlet holes for air, so that air is sucked in by the flow of the pulp itself.

The present invention is intended to provide a means for controlling the flow of pulp through the apparatus and for preventing the extremely fine gangue slimes from overflowing from the separating vessels with the froth.

The illustrated embodiment of the present invention comprises a separating box having a residues outflow at the bottom and an overflow at the top, a vessel mounted and preferably regulatable in height therein, with its lower end immersed in the liquid, and having an outlet at the bottom into the separating box and an overflow launder at the top, and a feed box having a discharge pipe at the bottom forming a pulp-operated air injector delivering into the said vessel and preferably below the surface of the liquid therein.

Preferably the discharge pipe leading from the feed box to the separating vessel and forming a pulp-operated air injector, is provided with means for the inlet of air thereto, such for example as a series of holes near its upper end. Preferably also a baffle is arranged within the separating box or within the hollow vessel in such relation to the delivery pipe to the said vessel as to insure the emulsification of the pulp.

If desired also a regulatable discharge orifice may be provided in the bottom of the feed box for controlling the flow of the material into the next succeeding separating box as by the use of detachable hollow plugs of different diameters adapted to be inserted in the residues outlet, as disclosed in the Seale & Shellshear Patent No. 1,311,919 above referred to.

One form of apparatus according to this invention will now be described with reference to the accompanying drawings in which—

Figure 1 shows a sectional elevation of the apparatus,

Fig. 2 a sectional side elevation, and

Fig. 3 a sectional plan on the line 3—3 of Fig. 2 of half the apparatus.

Fig. 4 is an outside view of two of the concentrating units arranged in cascade succession.

Each unit comprises a separating box A which is conveniently of rectangular form having a residues outflow B at the bottom discharging into a residues launder C, and an overflow D at the top discharging into an overflow launder $D^1$. Within the said separating vessel A are arranged two bottomless hollow cylindrical vessels E supported on cross beams F and adjustable in height, as for example by means of wood packing $F^1$. The vessels E are arranged at such a height that their lower edges are immersed in the liquid, and their upper edges are a little above the level thereof. Preferably the said vessels are cylindrical at their lower portions and conical at their upper portions, and around their upper edges are provided cylindrical launders G which may be arranged to discharge into another launder $G^1$ to conduct away the concentrates. Above the separating box A is arranged a feed box H which may be of any convenient shape, and to which the pulp is supplied in any convenient manner, as for example by the launder $H^1$. The feed box H is provided with two openings J at the bottom, and at each such opening is attached a pipe K leading down into the hollow vessels E mounted within the separating box A, the lower end of the pipes K being below the surface of the liquid. These pipes are provided with air inlets L near their upper end.

Baffles M are provided within the hollow vessels E immediately under the pipe K feeding the pulp thereto.

The operation of the apparatus is as follows:—Pulp to which is added a small proportion of a mineral-frothing agent, such as eucalyptus oil, is fed into the feed box H, from which it passes through the discharge pipes K to the separating box. In falling through the said pipes it sucks in air through the inlets L. It strikes against the baffles M, and the pulp is thereby thoroughly aerated and a froth of concentrates forms which floats to the surface of the liquid in the hollow vessels E, whence it flows into the launders G. The tailings pass into the bottom of the separating box A, and are discharged through the outlet B into the launder C. The excess liquor overflows over the side of the separating box into the overflow launder $D^1$, and is conducted back to the circuit, and the best condition of working the apparatus is found to be to keep the height of liquor in the separating box at the point of overflow when the circuit is at its minimum. By providing this overflow a quantity of the very fine gangue slimes which would be removed with the froth are removed from the apparatus.

It is to be understood that Figs. 1, 2 and 3 represent a single unit which, in the ordinary practice of the invention will be duplicated in cascade succession, in the general manner of the original cascade invention of Seale and Shellshear described in Patent No. 1,311,919 of August 5, 1919. That is to say, the discharge from the tailings outlet B, will be delivered into the feed Box H of the next unit and the discharge from the overflow D will be suitably conducted back into the circuit, and so on through any desired number of units in cascade succession.

This is illustrated in Fig. 4, wherein two concentrating units are shown in cascade succession. The launder C at the bottom of the first unit shown receives the discharge from that unit and is the feed-launder of the second unit shown, in correspondence with the launder $H^1$ (see Figs. 1 and 2) which is the feed-launder of the first unit shown and would receive the discharge of a unit in advance of the first unit shown if the system included such a unit, and also in correspondence with the launder C at the bottom of the second unit shown which receives the discharge from that unit and would be the feed-launder of the next succeeding unit, if such a unit were included in the system.

It is to be understood that various modifications may be made without departing from this invention. For example one or more hollow vessels may be mounted in each separating box, and if desired a series of separating boxes may be mounted one above the other, the discharge from each box acting as the feed to the next succeeding box as shown in Fig. 4, wherein two units are shown, the discharge from the first unit shown acting as the feed to the second unit shown. Similarly, the hollow vessels may be mounted in the apparatus described in the Patent 1,311,919 issued August 5, 1919, in which a series of separating boxes and feed boxes are provided, the feed boxes being of rectangular shape and having an inlet at the sides thereof, and the separating boxes being of circular shape.

What I claim as my invention and desire to secure by Letters Patent is:—

1. Apparatus for the concentration of ores by flotation separation comprising in combination a separating box having a residues outflow at the bottom and an overflow at the top, a vessel mounted therein with its lower end immersed in the liquid and having an outlet at the bottom into the separating box and an overflow launder at the top, and a feed box having a discharge pipe at the bottom forming a pulp-operated air injector delivering into the said vessel.

2. Apparatus for the concentration of ores by flotation separation comprising in combination a separating box having a residues outflow at the bottom and an overflow at the top, a vessel mounted therein with its lower end immersed in the liquid, and having an outlet at the bottom into the separating box and an overflow launder at the top, means for regulating the height of the vessel above the bottom of the separating box, and a feed box having a discharge pipe at the bottom forming a pulp-operated air injector delivering into the said vessel.

3. Apparatus for the concentration of ores by flotation separation comprising in combination a separating box having a residues outflow at the bottom and an overflow at the top, a vessel mounted therein with its lower end immersed in the liquid and having an outlet at the bottom into the separating box and an overflow launder at the top, means for regulating the height of the vessel above the bottom of the separating box, a feed box, means for flowing pulp therefrom by gravity into the said vessel and for entraining air by said pulp flow, and a baffle arranged in said vessel in the path of pulp flow from said feed box.

4. Apparatus for the concentration of ores by flotation separation comprising in combination a separating box having a residues outflow at the bottom and an overflow at the top, a vessel mounted therein with its lower end immersed in the liquid and having an outlet at the bottom into the separating box and an overflow launder at the top, means for regulating the height of the vessel above the bottom of the separating box, a feed box having a discharge pipe at the bottom provided with means for the inlet of air thereto and forming a pulp-operated air injector delivering into the said vessel, and a baffle arranged in said vessel in the path of pulp flow therein.

5. Apparatus for the concentration of ores by flotation separation comprising in combination a separating box having a regulatable residues outflow at the bottom and an overflow at the top, a vessel mounted therein with its lower end immersed in the liquid and having an outlet at the bottom into the separating box and an overflow launder at the top, means for regulating the height of the vessel above the bottom of the separating box, a feed box having a discharge pipe at the bottom provided with means for the inlet of air thereto and forming a pulp-operated air injector delivering into the said vessel, and a baffle arranged in said vessel in the path of pulp flow therein.

6. Apparatus for the concentration of ores by flotation separation comprising in combination a separating box having a regulatable residues outflow at the bottom and an overflow at the top, a vessel mounted therein with its lower end immersed in the liquid and having an outlet at the bottom into the separating box and an overflow launder at the top, means for regulating the height of the vessel above the bottom of the separating box, a feed box having a discharge pipe at the bottom provided with means for the inlet of air thereto and forming a pulp-operated air injector delivering into the said vessel below the surface of the liquid therein, and a baffle arranged in the path of pulp flow in said vessel.

7. Apparatus for the concentration of ores by flotation separation comprising in combination a separating box having a residues outflow at the bottom and an overflow at the top, a plurality of hollow vessels mounted therein with their lower ends immersed in the liquid and having an outlet at the bottom into the separating box and an overflow launder at the top, and a feed box having a plurality of discharge pipes at the bottom forming pulp-operated air injectors, one pipe delivering into each of the said vessels.

8. Apparatus for the concentration of ores by froth-flotation separation comprising an outer separating vessel, an inner separating vessel surrounded by and discharging into the outer vessel, means for maintaining a continuous gravity flow of pulp to the inner vessel with sufficient hydraulic violence to induce irruption of air into the pulp and agitation and aeration thereof in that degree necessary to form a metal-bearing froth in said inner separating vessel, a tailings outlet for said vessels, an overflow launder for the flotation froth which rises in the inner vessel, and a separate level-regulating overflow for the outer vessel.

9. Apparatus for the concentration of ores by froth-flotation separation comprising an outer separating vessel, an inner separating vessel surrounded by and discharging into the outer vessel, a gravity feed conduit leading to the inner vessel and including means for inducing the flow of air with the pulp in response to the gravity flow of pulp through the conduit whereby to deliver a gravity flow of air and pulp to the inner separating vessel, a tailings outlet for the vessels, an overflow launder for the concentrates froth which rises in the inner vessel, and a separate level-regulating overflow for the outer vessel.

10. Apparatus for the concentration of ores by froth-flotation separation comprising an outer separating vessel, an inner separating vessel surrounded thereby, said outer vessel having a level-regulating overflow and said inner vessel having a froth overflow, and said vessels communicating with each other below the levels of their said overflows, a tailings outlet also communicating with said vessels below their said overflow levels, and means for continuously feeding pulp and air together into said inner vessel having the froth overflow with hydraulic violence sufficient to effect agitation and aeration therein in that degree necessary to form a metal-bearing froth.

11. Apparatus for the concentration of ores by froth-flotation separation comprising an outer separating vessel, an inner separating vessel surrounded thereby, said outer vessel having a level-regulating overflow and said inner vessel having a froth overflow, and said vessels being in communication with each other below the levels of their said overflows, a tailings outlet also communicating with said vessels below their said overflow levels, and a gravity feed conduit leading into said inner vessel with the froth overflow and having means for inducing the flow of air with the pulp by the flow of pulp through the conduit whereby to continuously deliver air and pulp into said inner vessel.

12. Apparatus for the concentration of ores by froth-flotation separation comprising an outer separating vessel having a level-regulating overflow, an inner separating vessel having a froth overflow and surrounded by said outer vessel and communicating therewith below the levels of said overflows, a tailings outlet for said vessels also below their said overflow levels, a gravity feed conduit leading into the vessel with the froth overflow and including means for inducing the flow of air with the pulp by the flow of pulp through the conduit whereby to continuously deliver aerated pulp into the latter said vessel, and a baffle disposed in the path of pulp flow in the latter said vessel which has the froth overflow.

13. Apparatus for the concentration of ores by froth-flotation separation comprising a number of concentrating units in cascade succession, each including: a separating vessel, gravity-feeding means leading thereto and including means for inducing the flow of air with the pulp in response to the gravity flow of pulp through said means whereby to deliver a gravity flow of air and pulp to the separating vessel, a tailings outlet for the vessel, a separate level-regulating overflow therefor, a separate overflow launder for the concentrates froth which rises in the vessel, and means for varying the relative elevation of said separate level-regulating overflow and the overflow to said froth launder: each of said units, except the last, being arranged to deliver its tailings outflow to the gravity-feeding means leading to the next unit in the cascade succession, and to deliver its level-regulating overflow back to the circuit.

14. Apparatus for the concentration of ores by froth-flotation separation comprising a number of concentrating units in cascade succession, each including: two vessels one having a level-regulating overflow and the other a froth overflow and said vessels being in communication with each other below the levels of their said overflows, a tailings outlet also communicating with said vessels below their said overflow levels, and gravity-feeding means leading into said vessel with the froth overflow and having means for inducing the flow of air with the pulp by the flow of pulp whereby to continuously deliver air and pulp into the latter said vessel, and means for varying the relative elevation of said level-regulating and froth overflows: each of said units, except the last, being arranged to deliver its tailings outflow to the gravity-feeding means leading to the next unit in the cascade succession and its level-regulating overflow back to the circuit.

15. A froth-flotation ore-separating apparatus of the class in which the aeration and agitation are effected by hydraulic action of the flow of the ore pulp through successive separating vessels, comprising a concentrates overflow, a level-regulating overflow and a tailings outlet for each vessel, each level-regulating overflow except the last discharging into the next separating vessel in the series.

In testimony whereof I have signed my name to this specification in the presence of two subscribing witnesses.

FLEURY JAMES LYSTER.

Witnesses:
  ARTHUR GORE COLLISON,
  FLORENCE MANTHORPE.